(12) United States Patent
Minamikawa

(10) Patent No.: US 7,815,216 B2
(45) Date of Patent: Oct. 19, 2010

(54) BRACKET FOR USE IN CURTAIN AIRBAG AND CURTAIN AIRBAG APPARATUS

(75) Inventor: Takeki Minamikawa, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 12/318,769

(22) Filed: Jan. 8, 2009

(65) Prior Publication Data
US 2009/0267328 A1    Oct. 29, 2009

(30) Foreign Application Priority Data
Apr. 23, 2008  (JP) ............... 2008-112563

(51) Int. Cl.
*B60R 21/16* (2006.01)
(52) U.S. Cl. ................. 280/728.2; 280/730.2
(58) Field of Classification Search .............. 280/728.2, 280/730.2; 24/458; 248/220.31, 220.41, 248/225.21, 300; 403/13, 14
See application file for complete search history.

(56) References Cited

U.S. PATENT DOCUMENTS

| | | | |
|---|---|---|---|
| 6,520,533 B2 * | 2/2003 | Tanase et al. ............ | 280/730.2 |
| 7,040,647 B2 * | 5/2006 | Deligny et al. ........... | 280/728.2 |
| 7,320,477 B2 * | 1/2008 | Kawabe et al. ........... | 280/730.2 |
| 7,328,911 B2 * | 2/2008 | Chapman ................. | 280/728.2 |
| 7,331,598 B2 * | 2/2008 | Inazu et al. .............. | 280/728.2 |
| 7,631,889 B2 * | 12/2009 | Watanabe ................ | 280/728.2 |
| 7,654,559 B2 * | 2/2010 | Hidaka et al. ............ | 280/728.2 |
| 2003/0222435 A1 * | 12/2003 | Schmidt et al. .......... | 280/728.2 |
| 2004/0012172 A1 * | 1/2004 | Deligny et al. ........... | 280/728.2 |
| 2005/0029778 A1 * | 2/2005 | Weber et al. ............. | 280/728.2 |
| 2005/0046154 A1 * | 3/2005 | Rhea et al. ............... | 280/728.2 |
| 2005/0173902 A1 * | 8/2005 | Boxey .................... | 280/730.2 |
| 2006/0043708 A1 * | 3/2006 | Inazu et al. .............. | 280/730.2 |
| 2006/0197316 A1 | 9/2006 | Watanabe | |
| 2007/0063490 A1 * | 3/2007 | Minamikawa .......... | 280/728.2 |
| 2007/0241543 A1 * | 10/2007 | Jang et al. ................ | 280/730.2 |
| 2008/0303251 A1 * | 12/2008 | Sato et al. ................ | 280/730.2 |
| 2009/0079176 A1 * | 3/2009 | Hidaka et al. ........... | 280/743.1 |

FOREIGN PATENT DOCUMENTS

| | | |
|---|---|---|
| DE | 10 2005 051 128 A1 | 5/2007 |
| EP | 1 484 222 A1 | 12/2004 |
| EP | 1 764 271 A2 | 3/2007 |
| JP | 2000-079864 | 3/2000 |
| JP | 2003-165412 | 6/2003 |
| JP | 2004-098783 | 4/2004 |
| JP | 2004-210099 A | 7/2004 |
| JP | 2004-231147 A | 8/2004 |
| JP | 2005-104234 | 4/2005 |
| JP | 2006-069248 | 3/2006 |
| JP | 2008-024283 | 2/2008 |
| WO | WO 02/28690 A1 | 4/2002 |
| WO | WO 2007/025662 A1 | 3/2007 |

* cited by examiner

*Primary Examiner*—Paul N Dickson
*Assistant Examiner*—Joseph Rocca
(74) *Attorney, Agent, or Firm*—Manabu Kanesaka

(57) ABSTRACT

A curtain airbag having an attaching piece at an edge portion is attached to a vehicle body through a bracket. The bracket includes a plate portion, and a plurality of airbag-attaching portions attached to the plate portion for attaching the attaching piece. The attaching piece of the curtain airbag is selectively attached to one of the plurality of airbag-attaching portions.

7 Claims, 3 Drawing Sheets

BRACKET FOR USE IN CURTAIN AIRBAG AND CURTAIN AIRBAG APPARATUS

BACKGROUND OF THE INVENTION AND RELATED STATEMENT

The present invention relates to a bracket for use in a curtain airbag for attaching a curtain airbag to be developed in a curtain-like manner along a side of a vehicle body of an automobile or the like to the vehicle body and a curtain airbag apparatus provided with the same.

Hitherto, as one of airbags expanded and developed by introducing a gas in the event of collision of a vehicle such as an automobile or the like, a so-called curtain airbag developing in a curtain-like manner along a side of a vehicle body is well known. This curtain airbag is configured to be, normally, housed along an intersecting corner portion of a ceiling portion and a side surface portion of an interior of the vehicle body while being folded into an elongated shape along the intersecting corner portion. When the vehicle receives an impact from the side by a side collision or the like, the gas is introduced into an inside of the curtain airbag, and the curtain airbag is expanded and developed downward along the side of the vehicle body.

In general, this curtain airbag is attached to the vehicle body on both lateral sides by fixing a plurality of attaching pieces (attaching piece portions) provided at an edge portion of an airbag at a predetermined pitch to a plurality of respective attaching portions provided at the intersecting corner portion of the aforementioned vehicle interior via a bracket for use in the curtain airbag, for holding the attaching pieces, with bolts or the like. Such a bracket for use in a curtain airbag is described in, for example, Patent Document 1 (Japanese Unexamined Patent Application Publication No. 2005-104234)

The curtain airbag is configured to be attached to both lateral sides as described above. Further, the curtain airbag is attached to the vehicle body via the bracket for use in the curtain airbag at a plurality of portions in a front and rear direction of the vehicle body at each lateral side. Consequently, for optimizing in view of a reduction of the number of parts and an assembling work, it is demanded to improve general versatility so that the same bracket for use in the curtain airbag can be applied to a plurality of portions.

Accordingly, an object of the present invention is to provide a bracket for use in a curtain airbag and a curtain airbag apparatus capable of improving general versatility.

Further objects and advantages of the invention will be apparent from the following description of the invention.

SUMMARY OF THE INVENTION

In order to achieve the aforementioned object, a bracket for use in a curtain airbag according to a first aspect of the invention is a bracket for use in a curtain airbag for attaching a curtain airbag developing in a curtain-like manner along a side of a vehicle body to the vehicle body, wherein the bracket includes a plurality of airbag-attaching portions for attaching an attaching piece formed at an edge portion of the curtain airbag, in which the attaching piece of the curtain airbag is configured to be selectively attached to the plurality of airbag-attaching portions.

In general, a curtain airbag developing in a curtain-like manner along a side of a vehicle body is attached to the vehicle body on both lateral sides in a vehicle-width direction by fixing a plurality of attaching pieces provided at an edge portion of the curtain airbag at a predetermined pitch to an airbag-fixing portion provided at an intersecting corner portion of a ceiling portion and a side surface portion of an interior of the vehicle body via the bracket for use in the curtain airbag with a bolt or the like. The attaching piece of the curtain airbag is configured to be attached to an airbag-attaching portion of the bracket for use in the curtain airbag.

Here, in a first aspect of the present invention, the bracket for use in the curtain airbag is constructed to be provided with a plurality of airbag-attaching portions for attaching the attaching piece of the curtain airbag, and to allow the attaching piece of the curtain airbag to be selectively attached to the plurality of airbag-attaching portions. Thereby, the attaching piece can be attached to the airbag-attaching portion corresponding to a distance between the attaching pieces formed in the curtain airbag, upon selecting the airbag-attaching portion at a position corresponding to the attaching piece from the plurality of airbag-attaching portions of the bracket for use in the curtain airbag. As a result, the same bracket can be applied to a plurality of curtain airbags having attaching pieces whose distance between them is different from that of the attaching pieces of other curtain airbag, and general versatility of a bracket for use in a curtain airbag can be improved.

The bracket for use in the curtain airbag according to a second aspect of the invention is, in the aforementioned first aspect, formed to have a bilaterally-symmetric shape in a left and right direction corresponding to a longitudinal direction of the curtain airbag in a state where the curtain airbag is attached.

Thereby, it becomes possible to apply the same bracket for use in the curtain airbag on both lateral sides in a vehicle-width direction, and the general versatility of the bracket can further be improved.

The bracket for use in the curtain airbag according to a third aspect is, in the aforementioned second aspect, that the same number of the airbag-attaching portions is provided on the respective left and right sides thereof.

Thereby, while maintaining the bilaterally-symmetric shape, a bracket construction provided with a plurality of airbag-attaching portions can be made. As a result, the attaching piece of the curtain airbag can be selectively attached to the airbag-attaching portion in the plurality of airbag-attaching portions provided in the same number on both of the left and right sides. Also, the bracket for use in the curtain airbag can be applied to both lateral sides in the vehicle-width direction. Therefore, the general versatility of the bracket can further be improved.

The bracket for use in the curtain airbag according to the fourth aspect, in the aforementioned third aspect, has one vehicle-body attaching portion for attaching the bracket for use in the curtain airbag to the vehicle body at an approximately center position in the left and right direction thereof.

Thereby, while maintaining the bilaterally-symmetric shape, the bracket construction including the vehicle-body attaching portion can be made. Further, since only one vehicle-body attaching portion is provided, an attaching work for attaching the vehicle-body attaching portion to the vehicle body becomes easy as compared to the bracket including a plurality of vehicle-body attaching portions.

The bracket for use in the curtain airbag according to a fifth aspect, in the aforementioned fourth aspect, includes a projecting portion capable of being fitted into a fitting hole provided in the vehicle body.

When the attaching piece of the curtain airbag is fixed to either one of the left and right airbag-attaching portions of the bracket for use in the curtain airbag, rotation force for rotating the bracket about the vehicle-body attaching portion at an approximately center position in the left and right direction is generated by weight of the curtain airbag.

In the fifth aspect of the invention, the projecting portion of the bracket for use in the curtain airbag is fitted into the fitting hole provided in the vehicle body. Thereby, the bracket can be prevented from being rotated about the vehicle-body attaching portion due to the aforementioned rotation force. Furthermore, there is also an advantage that the positioning can be easily performed when the bracket for use in the curtain airbag is attached to the vehicle body side.

The bracket for use in the curtain airbag according to a sixth aspect, in the aforementioned fifth aspect, includes the same number of the projecting portions on the respective left and right sides.

Thereby, while maintaining the bilaterally-symmetric shape, the bracket construction including a plurality of projecting portions can be made. As a result, the bracket for use in the curtain airbag can be applied to both lateral sides in the vehicle-width direction, and the bracket can be prevented from being rotated about the vehicle-body attaching portion.

In order to achieve the aforementioned object, the curtain airbag apparatus according to a seventh aspect of the invention includes a curtain airbag developing in -a curtain-like manner along a side of a vehicle body, the bracket for use in the curtain airbag according to any one of the first through sixth aspects for attaching the curtain airbag to the vehicle body, and an inflator for supplying a gas into the curtain airbag.

In the curtain airbag apparatus, a curtain airbag is housed along an intersecting corner portion of a ceiling portion and a side surface portion of an interior of the vehicle body in a state of being folded into an elongated shape. In the event of receiving an impact from a side by a side collision or the like, a gas is introduced into an inside of the curtain airbag from an inflator, and the curtain airbag is expanded and developed downward along the side of the vehicle body.

In general, a curtain airbag is attached to the vehicle body on both lateral sides in a vehicle-width direction by fixing a plurality of attaching pieces provided at an edge portion of the curtain airbag at a predetermined pitch to a plurality of respective fixing portions provided at the intersecting corner portion of the ceiling portion and the side surface portion of the interior of the vehicle body via the bracket for use in the curtain airbag with bolts or the like. The attaching piece of the curtain airbag is configured to be attached to the airbag-attaching portion of the bracket for use in the curtain airbag.

In the seventh aspect of the invention, the bracket for use in the curtain airbag is constructed to be provided with a plurality of airbag-attaching portions for attaching the attaching piece of the curtain airbag, and to allow the attaching piece of the curtain airbag to be selectively attached to the plurality of airbag-attaching portions. Thereby, the attaching piece can be attached to the airbag-attaching portion corresponding to a distance between the attaching pieces formed in the curtain airbag, upon selecting the airbag-attaching portion at a position corresponding to the attaching piece from the plurality of airbag-attaching portions of the bracket for use in the curtain airbag. As a result, the same bracket can be applied to a plurality of curtain airbags having attaching pieces whose distance between them is different from that of the attaching pieces of other curtain airbag, and the general versatility can be improved.

According to the present invention, general versatility of a bracket for use in a curtain airbag can be improved.

DETAILED DESCRIPTION OF PREFERRED EMBODIMENTS

Hereinafter, an embodiment of the present invention will be explained with reference to the drawings.

Figure 1:
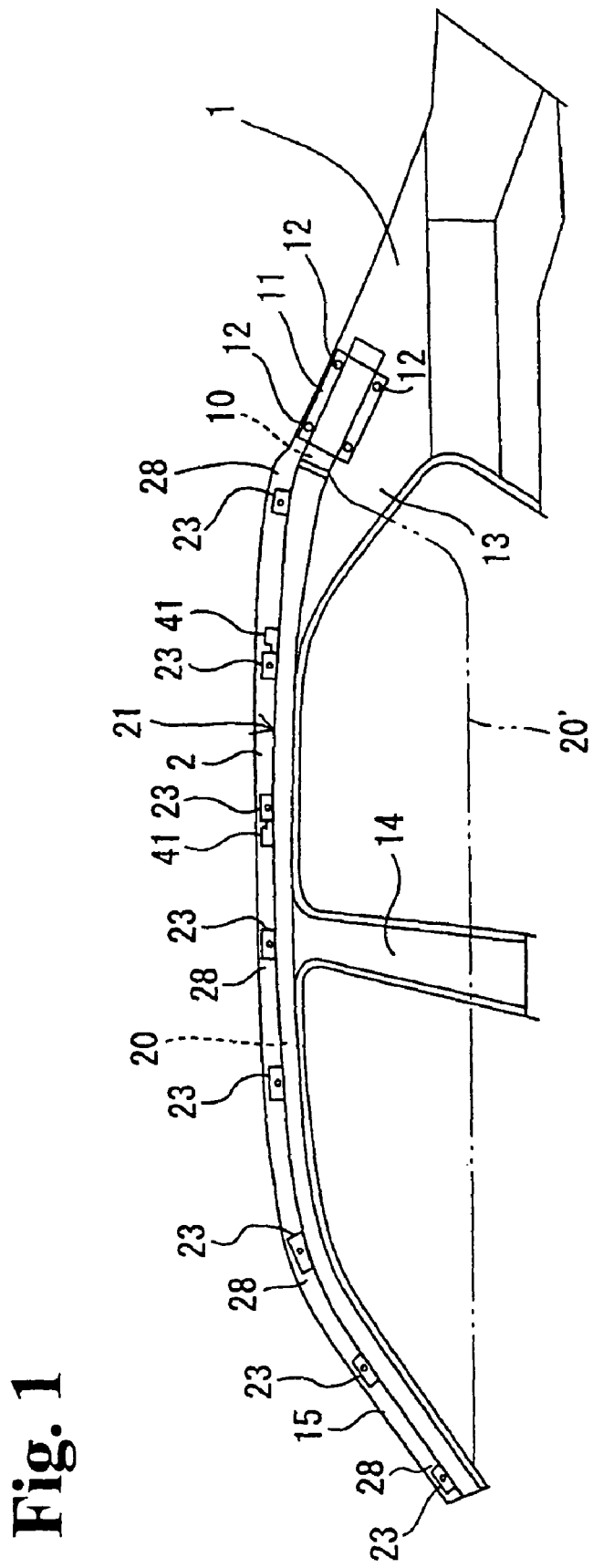
FIG. 1 is an explanatory view illustrating a state in which a curtain airbag apparatus according to an embodiment of the present invention is attached to an automobile.

FIG. 1 is an explanatory view illustrating a state in which a curtain airbag apparatus according to the embodiment of the present invention is attached to an automobile (the explanation is made such that the left side corresponds to a front side of a vehicle body 1, and the right side corresponds to a rear side thereof). Further, FIG. 2 is a perspective view illustrating a state at a time when a curtain airbag is housed, while partially breaking the same.

Figure 2:
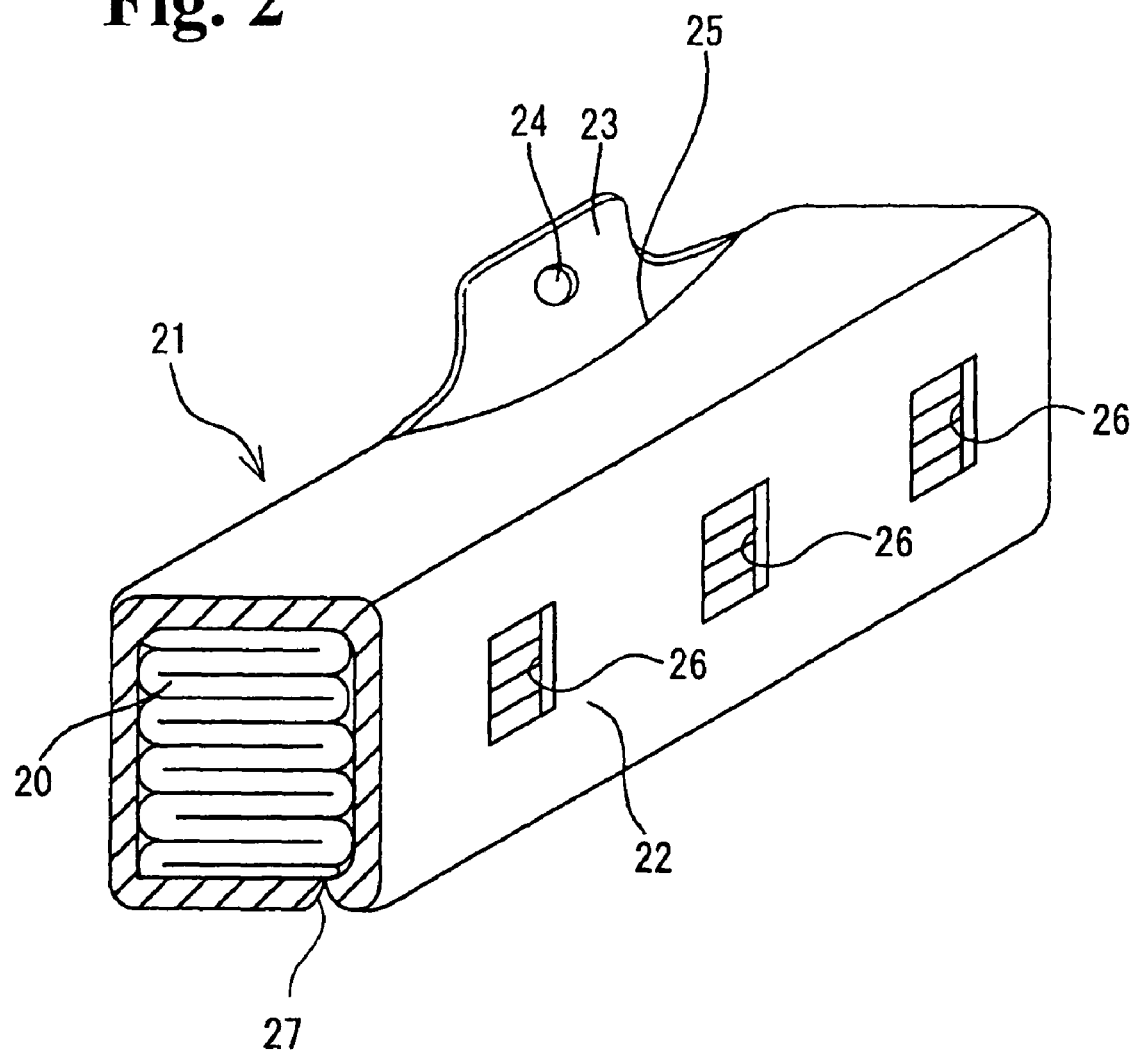
FIG. 2 is a perspective view illustrating a state in which the curtain airbag according to the embodiment present invention is housed, while partially cutting the same.

In FIG. 1 and FIG. 2, a curtain airbag apparatus 21 is provided at an intersecting portion of a ceiling portion and a side surface portion in an interior of the vehicle body 1 of the automobile.

The curtain airbag apparatus 21 is provided with a curtain airbag 20, a covering member 22, which can be ruptured, for covering and holding a folded-back curtain airbag 20, an inflator 10 for supplying a gas into the curtain airbag 20 from a rear end portion side of the curtain airbag apparatus 21, a plurality of brackets 40 (not shown) for attaching the curtain airbag 20 to the vehicle body 1, and a bracket 41. Further, in the event of a side collision, an overturn, or the like of the automobile, a sensor (not shown) for sending an ignition signal to the inflator 10 upon detecting the collision detects the side collision or the like, and a start signal is inputted from an inflator control circuit (not shown) to an initiator (not shown) of the inflator 10. Then, the aforementioned initiator starts, the inflator 10 is activated, the gas for expanding an airbag is blown out, and the curtain airbag 20 is expanded. Thus, the curtain airbag 20 is developed in a lower direction as indicated by a chain double-dashed line 20' in FIG. 1, and a head portion of an occupant is restrained.

As illustrated in FIG. 2, the curtain airbag 20 is held by means of the covering member 22 in a state of being folded back upon overlapping in an upper and lower direction in a bellows-like manner so as to have a rectangular shape in cross-section. At this moment, an ear-shaped attaching piece 23 projecting from an edge portion at an upper end of the curtain airbag 20 is projected upward while passing through an elongated opening portion (a slot) 25 that is provided on a vehicle side of an upper surface portion of the covering member 22.

The attaching piece 23 is provided in plurality along a longitudinal direction of the curtain airbag 20. At each of attaching piece 23, an insertion hole 24 for inserting an attaching implement (not shown, for example, a rivet, an attaching bolt, or the like) is provided. At a side surface portion on a vehicle interior side of the covering member 22, a plurality of openings 26 in an upper and lower direction are provided along the longitudinal direction. The folded-back state of the curtain airbag 20 can be visually observed from outside the covering member 22 through the opening 26.

At a corner portion on the vehicle interior side, where a side surface portion and a bottom surface portion on the vehicle interior side of the covering member 22 intersect, a rupturing portion 27 serving as a rupturing point of the covering member 22 at a time when the airbag 20 is expanded is provided. An outer periphery of the covering member 22 is wound and held at each of predetermined distances by means of a plurality of rupturable bands (not shown).

The curtain airbag 20 is formed to have a shape inflected in an approximately bow-like manner in a longitudinal direction, and is fixed to an airbag-fixing portion 28 provided at the intersecting corner portion of the ceiling portion and the side surface portion of the interior of the vehicle body 1, in concrete terms, provided at a bow-shaped portion following along a roof side rail 2 from an A-pillar 15 (front pillar) via the bracket 40 and the bracket 41 (the bracket for use in the curtain airbag). There are two of the brackets 41 provided between a B-pillar 14 (center pillar) located at a center portion of the vehicle body 1 and a C-pillar 13 (rear pillar) located at a rear portion of the vehicle body 1 in the aforementioned airbag-fixing portion 28 in this embodiment. The bracket 41 is, although details are described later, provided with a plurality of (for example, two in this embodiment) airbag-attaching portions 43 for attaching the attaching piece 23 of the curtain airbag 20, and is constructed such that the attaching piece 23 can be selectively attached to a plurality of airbag-attaching portions 43 (refer to FIG. 3 described later). Incidentally, the brackets 40 other than the bracket 41 are, although a detailed structure thereof is not specifically shown, normal brackets having only one airbag-attaching portion for attaching the attaching piece 23 of the curtain airbag 20 (In FIG. 1, only the attaching pieces 23 of the curtain airbag 20 attached by means of the brackets 40 are illustrated).

In the aforementioned C-pillar 13 at the rear portion of the vehicle body 1, the inflator 10 is provided-and is attached to the C-pillar 13 by bolts 12 via a bracket 11 encompassing the inflator 10.

Figure 3A:
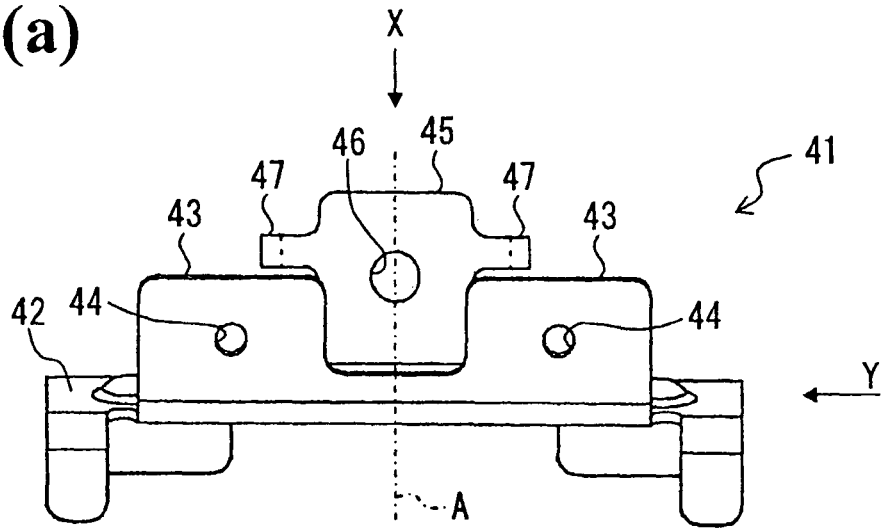
FIG. 3(a) is a front view.
Figure 3B:
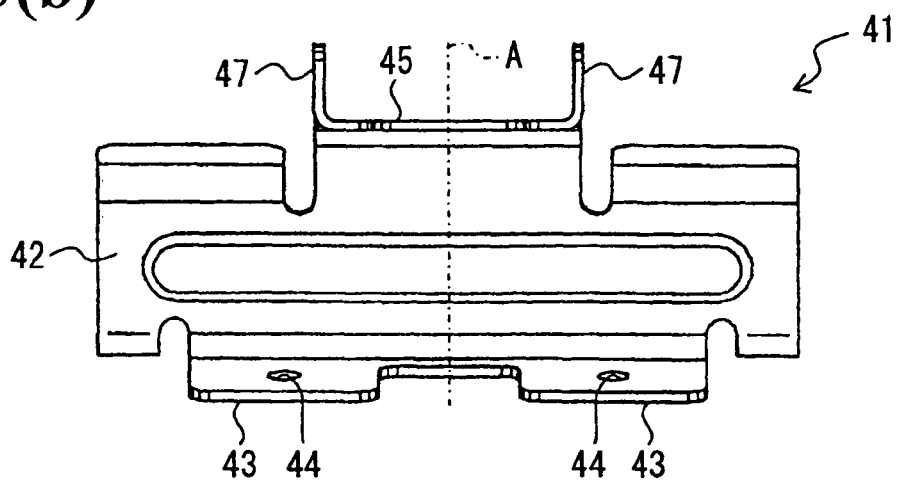
FIG. 3(b) is a top plan view looking from a direction indicated by an arrow X in FIG. 3(a)
Figure 3C:
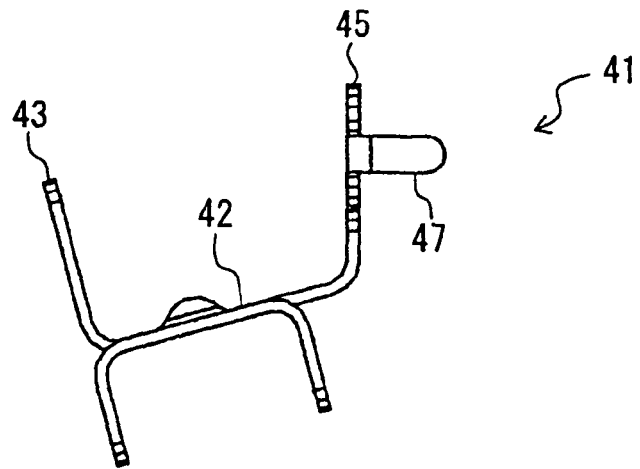
FIG. 3(c) is a side view looking from a direction indicated by an arrow Y in FIG. 3(a), illustrating a detailed structure of a bracket.

FIG. 3(a) is a front view illustrating the detailed structure of the bracket 41, FIG. 3(b) is a top plan view illustrating the bracket 41 looking from a direction indicated by an arrow X in FIG. 3(a), and FIG. 3(c) is a side view illustrating the bracket 41 looking from a direction indicated by an arrow Y in FIG. 3(a).

As illustrated in FIG. 3(a) through FIG. 3(c), the bracket 41 is formed to have an approximately bilaterally-symmetric shape with respect to a center surface A serving as a center position in the left and right direction corresponding to a longitudinal direction of the curtain airbag 20 (left and right direction in FIG. 3(a) and FIG. 3(b)) in an attaching state of the curtain airbag 20 (a state shown in FIG. 1). This bracket 41 is provided with a plurality of airbag-attaching portions 43 (two airbag-attaching portions 43 in this embodiment), which is formed by bending upward on the inside of the vehicle interior of the bottom plate portion 42 (the front side of the paper surface in FIG. 3(a), the lower side in FIG. 3(b), and the left side in FIG. 3(c)), for attaching the attaching piece 23 that is formed in the curtain airbag 20. The airbag-attaching portions 43, 43 are provided in the same number (one each in this embodiment) at each position having the same distance from the center surface A in each of the left and right sides so as to form the bilaterally-symmetric shape with respect to the aforementioned center surface A. In the respective airbag-attaching portions 43, insertion holes 44 for inserting an attaching implement (not shown, for example, a rivet, an attaching bolt, or the like) for fixing the attaching piece 23 of the curtain airbag 20 to the airbag-attaching portions 43 are respectively provided at positions having the same distance from the aforementioned center surface A. The attaching piece 23 of the curtain airbag 20 can be selectively attached to two of the airbag-attaching portions 43 of the bracket 41 by inserting the aforementioned attaching implement into the insertion hole 24 of the attaching piece 23 and the insertion hole 44 of the airbag-attaching portion 43 (in a case of the attaching bolt, by screwing with the nut (not shown) after inserting) in a state that the attaching piece 23 of the curtain airbag 20 is selectively overlapped with either one of two airbag-attaching portions 43.

Further, the bracket 41 is provided with a vehicle-body attaching portion 45, which is formed by bending upward in the same manner as that of the aforementioned airbag-attaching portion 43 on the vehicle body side of the bottom plate portion 42 (a back-side of the paper surface in FIG. 3(a), an upper side in FIG. 3(b), and a right side in FIG. 3(c)), for attaching the bracket 41 to the vehicle body 1. Only one vehicle-body attaching portion 45 is provided so that the center position thereof is located on the aforementioned center surface A. In the vehicle-body attaching portion 45, an insertion hole 46 for inserting the attaching implement (not shown, for example, a rivet, an attaching bolt, or the like) for fixing the bracket 41 to the vehicle body 1 is provided in a manner such that the center position thereof is located on the aforementioned center surface A. The bracket 41 is fixed to the vehicle body 1 by means of the aforementioned attaching implement inserted into the insertion hole 46 of the vehicle-body attaching portion 45 and fitted into the fitting hole (not shown) provided in the aforementioned airbag-fixing portion 28 on the vehicle body side (in a case of the attaching bolt, by screwing into the screw hole).

Moreover, the bracket 41 is provided with projecting portions 47, 47 which are formed in the same number (one each in this embodiment) on each of the left and right sides of the vehicle-body attaching portion 45 by bending toward the vehicle body side, and which can be fitted into fitting holes (not shown) provided in the aforementioned airbag-fixing portion 28 on the vehicle body side. When the curtain airbag 20 is attached to the vehicle body 1 via the bracket 41, the aforementioned projecting portion 47 is fitted to the fitting hole provided in the aforementioned airbag-fixing portion 28 on the vehicle body side. Thereby, the bracket 41 can be prevented from rotating about the vehicle-body attaching portion 45 (in more accurate terms, around the insertion hole 46) due to rotation force generated by fixing the attaching piece 23 of the curtain airbag 20 to either one of the left and right airbag-attaching portions 43 of the bracket 41.

As explained above, the bracket 41 of the present embodiment has two airbag-attaching portions 43 for attaching the attaching piece 23 of the curtain airbag 20 and is constructed such that the attaching-piece 23 of the curtain airbag 20 can be selectively attached to either one of two airbag-attaching portions 43. Thereby, the attaching piece 23 can be attached to the airbag-attaching portion 43 while selecting the airbag-attaching portion 43 at a position corresponding to the attaching piece 23 to be attached thereto in two of the airbag-attaching portions 43, 43 of the bracket 41 corresponding to a distance between the attaching pieces 23 formed in the curtain airbag 20. That is, for example, in a case that a distance between the attaching pieces 23 of the curtain airbag 20 is relatively narrow, the attaching pieces 23, 23 are respectively attached to the two airbag-attaching portions 43, 43 located inside within the four airbag-attaching portions 43 of the two brackets 41, 41 located next to each other, (a state shown in FIG. 1). Alternatively, for example, in a case that the distance between the attaching pieces 23 of the curtain airbag 20 is relatively wide, the attaching pieces 23, 23 are respectively attached to the two airbag-attaching portions 43, 43 located outside within the four airbag-attaching portions 43 of the two brackets 41, 41 located next to each other. As a result, the same bracket 41 can be applied to a plurality of curtain airbags 20 having attaching pieces 23 whose distance therebetween is different from that of the attaching pieces 23 of other curtain airbag 20, and general versatility can be improved.

Further, in the present embodiment, specifically, the bracket 41 is formed to have a bilaterally-symmetric shape. Thereby, it becomes possible to apply the same bracket 41 on both lateral sides in a vehicle-width direction of the vehicle body 1, and the general versatility of the bracket 41 can further be improved.

Furthermore, in the present embodiment, specifically, the bracket 41 is provided with the same number of airbag-attaching portions 43 (one in the aforementioned embodiment) on the respective left and right sides. Thereby, a bracket construction including a plurality of airbag-attaching portions 43 (two in the aforementioned embodiment) can be made, while maintaining the bilaterally-symmetric shape of the bracket 41.

Moreover, in the present embodiment, specifically, the bracket 41 is provided with one vehicle-body attaching portion 45 for attaching the bracket 41 to the vehicle body 1 on the center surface A serving as the approximately center position in the left and right direction. Thereby, a bracket construction including the vehicle-body attaching portion 45 can be made, while maintaining the bilaterally-symmetric shape of the bracket 41. Further, since only one vehicle-body attaching portion 45 is provided, an attaching work for attaching the bracket 41 to the vehicle body 1 becomes easier as compared to a case where the curtain airbag 20 is attached to the vehicle body 1 with a bracket provided with a plurality of the vehicle-body attaching portion 45.

Furthermore, in the present embodiment, specifically, the bracket 41 is provided with the projecting portions 47, 47 that can be fitted into the fitting holes (not shown) provided in the aforementioned airbag-fixing portion 28 on the vehicle body side, on both of the left and right sides of the vehicle-body attaching portion 45. That is, when the attaching piece 23 of the curtain airbag 20 is fixed to any one of the left and right airbag-attaching portions 43 of the bracket 41, the rotation force for rotating the bracket 41 about the vehicle-body attaching portion 45 at the approximately center position in the left and right direction thereof is generated by weight of the curtain airbag 20. However, the bracket 41 can be prevented from rotating about the vehicle-body attaching portion 45 due to the aforementioned rotation force, by fitting the projecting portions 47, 47 of the bracket 41 into the respective fitting holes provided in the vehicle body 1 in the present embodiment. Moreover, there is also an advantage in which positioning can be easily performed when the bracket 41 is attached to the vehicle body side by fitting the projecting portion 47 of the bracket 41 into the fitting hole of the vehicle body 1.

Incidentally, although the above-described embodiment is illustrative of the preferred embodiment of the present invention, the invention is not limited thereto, and various modifications may be made within a scope not departing from the gist of the present invention.

For example, in the above-described embodiment, although the bracket 41 is formed to have a bilaterally-symmetric shape, in obtaining the main advantage to improve the general versatility of the bracket for use in the curtain airbag in the present invention, the bracket 41 is not always necessary to be formed to have the bilaterally-symmetric shape as long as the bracket 41 is provided with a plurality of the airbag-attaching portion 43, and the attaching piece 23 of the curtain airbag 20 can be selectively attached to the plurality of airbag-attaching portion 43.

Moreover, in the above-described embodiment, although a case that the bracket 41 is provided with two airbag-attaching portions 43 is explained as an example, the construction may be made such that a lot more airbag-attaching portions 43 are provided without being limited thereto. Further, although the airbag-attaching portion 43 is formed by bending the bottom plate portion 42 upward, without being limited thereto, the airbag-attaching portion 43 may be formed by bending the bottom plate portion 42 downward, or may be formed into other shapes. Namely, it is sufficient that the construction is made such that the attaching piece 23 of the curtain airbag 20 can be attached to the airbag-attaching portion 43 with an attaching implement (a rivet, an attaching bolt, or the like).

Further, in the above-described embodiment, although a case that the bracket 41 is provided with only one vehicle-body attaching portion 45 is explained as an example, without being limited thereto, two or more vehicle-body attaching portions 45 may be provided. Furthermore, although the vehicle-body attaching portion 45 is formed by bending the bottom plate portion 42 upward, without being limited thereto, the vehicle-body attaching portion 45 may be formed by bending the bottom plate portion 42 downward, or may be formed into other shapes. Namely, it is sufficient that the construction is made such that the bracket 41 can be attached to the vehicle body 1 with an attaching implement (a rivet, an attaching bolt, or the like).

Furthermore, in the above-described embodiment, although a case that the bracket 41 is provided with two projecting portions 47, 47 formed on both of the left and right sides of the vehicle-body attaching portion 45 is explained as an example, without being limited thereto, the construction may be also made such that the bracket 41 is provided with only one projecting portion 47. In this case, it is sufficient to provide the projecting portion 47 to be positioned on the center surface A so that the bracket 41 is formed to have a bilaterally-symmetric shape. Moreover, it is also sufficient that the forming position of the projecting portion 47 may also be the position other than that in the vehicle-body attaching portion 45.

Further, in the above-described embodiment, although a case that the two brackets 41, 41 are provided between the B-pillar 14 and the C-pillar 13 in an airbag-attaching portion 28 is explained as an example, without being limited thereto, the bracket 41 may be provided between the A-pillar 15 and the B-pillar 14, or other positions. Alternatively, the bracket 41 may also be provided at three or more positions.

The disclosure of Japanese Patent Application No. 2008-112563 filed on Apr. 23, 2008 is incorporated as a reference.

While the invention has been explained with reference to the specific embodiments of the invention, the explanation is illustrative and the invention is limited only by the appended claims.

What is claimed is:

1. A bracket for attaching a curtain airbag to a vehicle body, said curtain airbag having an attaching piece formed at an edge portion thereof, said bracket comprising:
   a plate portion, and
   a plurality of airbag-attaching portions extending upwardly from and integral with an edge of the plate portion, said plurality of airbag-attaching portions being laterally spaced apart from each other for attaching the attaching piece so that the attaching piece of the curtain airbag is selectively attached to one of the plurality of airbag-attaching portions, each of the plurality of airbag-attaching portions having an insertion hole adapted for receiving an attaching implement, wherein the bracket has a bilaterally-symmetric shape in one direction corresponding to a longitudinal direction of the curtain airbag in a state where the curtain airbag is attached, and a common number of the airbag-attaching portions are provided on two sides along said one direction of the bracket, the bracket further comprising:

one vehicle-body attaching portion fixed to the plate portion for attaching the bracket to the vehicle body, said vehicle-body attaching portion being located at about a center position in said one direction thereof, and a projecting portion adapted to fit into a fitting hole provided in the vehicle body, wherein said airbag-attaching portions and said vehicle-body attaching portion are arranged to generally face each other on opposite sides of the plate portion with a space therebetween.

2. The bracket for attaching the curtain airbag according to claim 1, wherein the common number of the projecting portions are provided on left and right sides relative to the one vehicle-body attaching portion, respectively.

3. The bracket for attaching the curtain airbag according to claim 1, wherein said projecting portion projects in a direction away from the airbag-attaching portion.

4. A. curtain airbag apparatus comprising:
the curtain airbag;
the bracket according to claim 1; and
an inflator for supplying a gas into the curtain airbag.

5. The curtain airbag apparatus according to claim 4, wherein the airbag comprises a covering member which encloses the air bag in a folded condition, and which has a rupturing portion.

6. A bracket for attaching a curtain airbag to a vehicle body, said curtain airbag having an attaching piece formed at an edge portion thereof, said bracket comprising:

a plate portion, and a plurality of airbag-attaching portions extending upwardly from and integral with an edge of the plate portion, said plurality of airbag-attaching portions being laterally spaced apart from each other for attaching the attaching piece so that the attaching piece of the curtain airbag is selectively attached to one of the plurality of airbag-attaching portions, each of the plurality of airbag-attaching portions having an insertion hole adapted for receiving an attaching implement, wherein the plate portion has an elongated portion, and an upwardly extending wall portion projecting upwardly from one side of the elongated portion adapted to be connected to a vehicle panel and provided with an aperture for receiving an attaching element; and two upwardly extending wall portions are formed at the other side of the elongated portion as the airbag-attaching portions, each having one insertion hole adapted for receiving an attaching implement.

7. The bracket for attaching the curtain airbag according to claim 6, further comprising downwardly extending portions formed at both ends of the elongated portion, and a space between the downwardly extending portions adapted to allow an airbag covering member to enter therebetween.

* * * * *